United States Patent
Wu et al.

(10) Patent No.: US 9,785,504 B2
(45) Date of Patent: Oct. 10, 2017

(54) SYSTEMS AND METHODS FOR OVERLAPPING PARITY SECTORS

(71) Applicant: Avago Technologies General IP (Singapore) Pte. Ltd., Singapore (SG)

(72) Inventors: Xuebin Wu, San Jose, CA (US); Yang Han, Sunnyvale, CA (US); Shaohua Yang, San Jose, CA (US); Dan Liu, Shanghai (CN); Kaitlyn T. Nguyen, San Jose, CA (US); Yoon L. Liow, Allentown, PA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 45 days.

(21) Appl. No.: 14/949,632

(22) Filed: Nov. 23, 2015

(65) Prior Publication Data

US 2017/0147438 A1    May 25, 2017

(51) Int. Cl.
*G06F 11/10*    (2006.01)
*G06F 11/00*    (2006.01)

(52) U.S. Cl.
CPC ........ *G06F 11/1096* (2013.01); *G06F 11/006* (2013.01); *G06F 2201/845* (2013.01)

(58) Field of Classification Search
CPC .............. G06F 3/0641; G06F 11/1453; G06F 17/30156; G06F 3/0608; H03M 13/1525; H03M 13/611; H03M 13/19
See application file for complete search history.

(56) References Cited

U.S. PATENT DOCUMENTS

| | | | |
|---|---|---|---|
| 7,266,750 B1* | 9/2007 | Patapoutian | H03M 13/1105 714/758 |
| 8,671,326 B1* | 3/2014 | Tang | H03M 13/1102 714/758 |
| 8,856,611 B2 | 10/2014 | Wu et al. | |
| 9,160,373 B1* | 10/2015 | Varnica | H03M 13/2909 |
| 2008/0242236 A1* | 10/2008 | Spencer | H04L 1/1614 455/73 |
| 2009/0273492 A1* | 11/2009 | Yang | G11B 20/18 341/81 |
| 2013/0111294 A1* | 5/2013 | Tan | H03M 5/145 714/755 |

(Continued)

OTHER PUBLICATIONS

Zhenyu Liu and D. A. Pados, "A decoding algorithm for finite-geometry LDPC codes," in IEEE Transactions on Communications, vol. 53, No. 3, pp. 415-421, Mar. 2005.*

(Continued)

*Primary Examiner* — Cynthia Britt
(74) *Attorney, Agent, or Firm* — Sheridan Ross P.C.

(57) ABSTRACT

An apparatus for processing data includes a data detector configured to detect data values in data sectors to yield detected data, a data decoder configured to decode the detected data, wherein the data detector and the data decoder are configured to process the data sectors in a series of global iterations, a memory configured to store parity sector soft information, and a scheduler configured to control overlapping reprocessing of a failed sector in the data detector and the data decoder based on the parity sector soft information with processing of another data sector in the data detector and the data decoder.

20 Claims, 5 Drawing Sheets

(56) References Cited

U.S. PATENT DOCUMENTS

| | | | |
|---|---|---|---|
| 2013/0111297 A1* | 5/2013 | Tan | H03M 13/1128 |
| | | | 714/758 |
| 2013/0232390 A1* | 9/2013 | Zhang | G11B 20/1833 |
| | | | 714/755 |
| 2013/0332794 A1* | 12/2013 | Yen | G11B 20/10527 |
| | | | 714/758 |
| 2014/0032989 A1* | 1/2014 | Tan | H03M 13/05 |
| | | | 714/752 |
| 2014/0089757 A1 | 3/2014 | Yang et al. | |
| 2014/0129905 A1* | 5/2014 | Chen | H03M 13/1102 |
| | | | 714/770 |
| 2014/0229806 A1* | 8/2014 | Li | H03M 13/2975 |
| | | | 714/785 |
| 2015/0135031 A1 | 5/2015 | Cohen et al. | |
| 2015/0180682 A1* | 6/2015 | Paker | H04L 25/0246 |
| | | | 375/232 |

OTHER PUBLICATIONS

K. C. Ho, P. C. Fang, H. P. Li, C. Y. M. Wang and H. C. Chang, "A 45nm 6b/cell charge-trapping flash memory using LDPC-based ECC and drift-immune soft-sensing engine," 2013 IEEE International Solid-State Circuits Conference Digest of Technical Papers, San Francisco, CA, 2013, pp. 222-223.*

M. H. Azmi, Jun Li, Jinhong Yuan and R. Malaney, "Soft decode-and-forward using LDPC coding in half-duplex relay channels," 2011 IEEE International Symposium on Information Theory Proceedings, St. Petersburg, 2011, pp. 1479-1483.*

\* cited by examiner

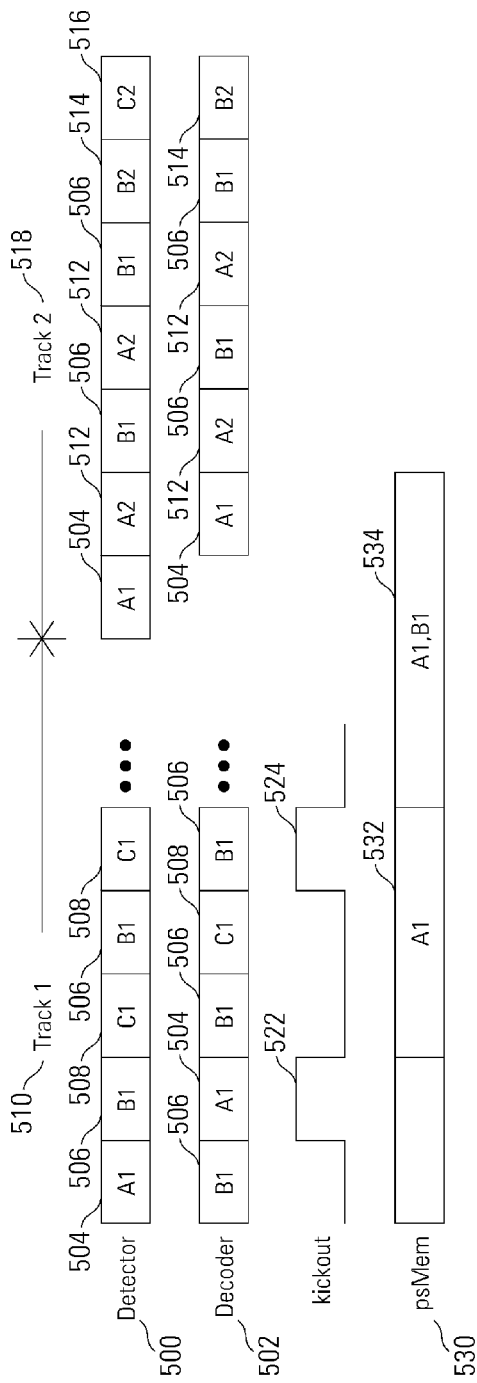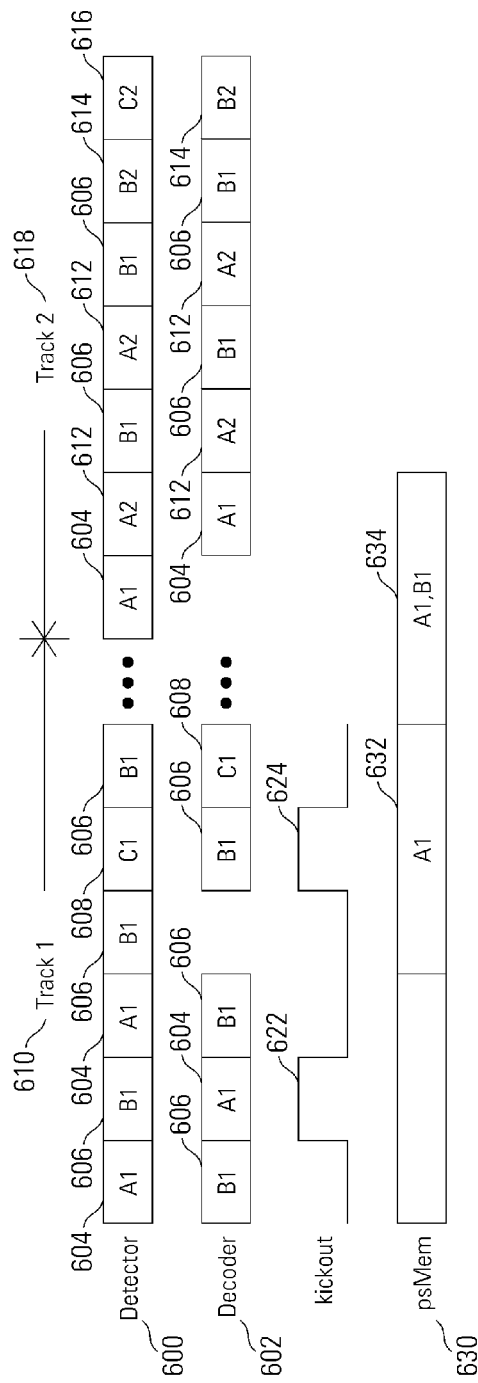

SYSTEMS AND METHODS FOR OVERLAPPING PARITY SECTORS

FIELD OF THE INVENTION

Various embodiments of the present invention provide systems and methods for processing data, and more particularly to systems and methods for overlapping parity sector processing in an iterative data processing system with a detector and decoder.

BACKGROUND

Various data processing systems have been developed including storage systems, cellular telephone systems, and radio transmission systems. In such systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. The effectiveness of any transfer is impacted by any losses in data caused by various factors. Many types of error checking systems have been developed to detect and correct errors in digital data. For example, parity bits can be added to groups of data bits, ensuring that the groups of data bits (including the parity bits) have either even or odd numbers of ones. The parity bits can be used in error correction systems, including in low density parity check (LDPC) decoders.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

FIG. 5 depicts a scheduler mode for a read channel with overlapping parity sector processing which collects decoder soft information on the fly at kickout of a data sector in accordance with some embodiments of the present invention;

FIG. 6 depicts a scheduler mode for a read channel with overlapping parity sector processing which collects detector soft information on the fly at kickout of a data sector in accordance with some embodiments of the present invention;

DETAILED DESCRIPTION OF THE INVENTION

Figure 1:
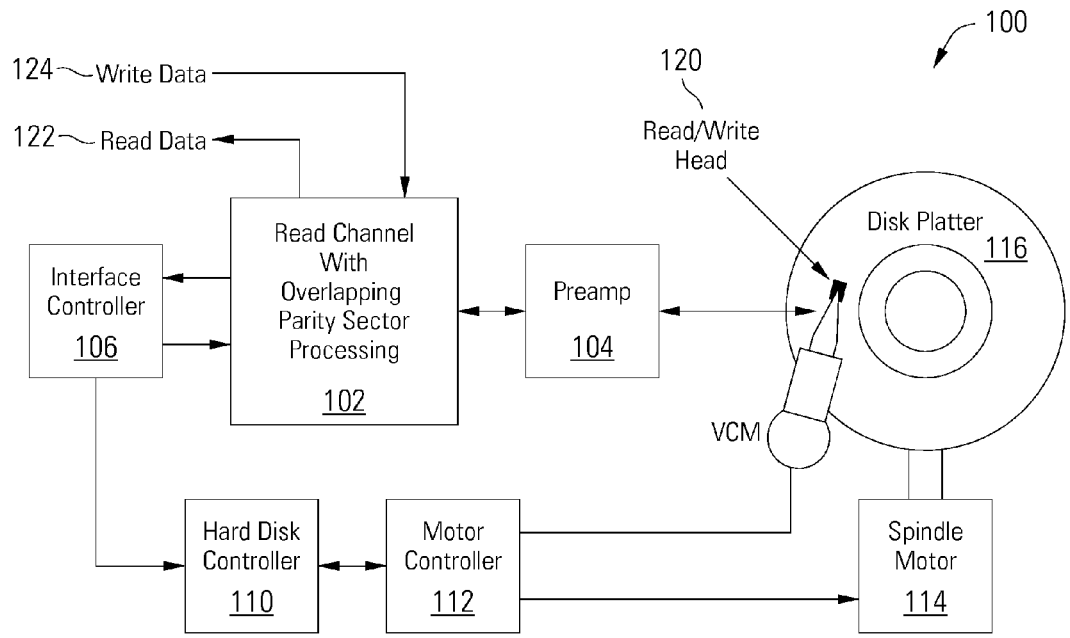
FIG. 1 depicts a storage system including a read channel with overlapping parity sector processing in accordance with one or more embodiments of the present invention.

Embodiments of the present invention are related to systems and methods for systems and methods for overlapping parity sector processing in an iterative data processing system with a detector and decoder. In a typical magnetic storage system, digital data is stored in a series of concentric circular tracks along a storage medium. Each data track can be divided into many data sectors. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned anew over the track as the storage medium is rotated. In this position, the previously stored magnetic flux pattern induces a current in the head assembly that can be converted to the previously recorded digital data.

When a hard disk controller issues a read command for a data track, each sector in the track is retrieved by the head assembly and data corresponding to the sector is processed. The term track is also used generically herein to refer to a group of data sectors or codewords stored on a non-magnetic storage system or transmitted by any mean, which is treated as a group, and in which each data sector is independently encoded with parity bits for that sector, and whose data sectors are collectively encoded with parity bits to generate an additional parity sector or parity codeword of parity bits. In some embodiments, the data sectors to generate a parity sector before each data sector and the parity sector are individually encoded with their own parity bits. In some other embodiments, the parity sectors are individually encoded first and are then encoded as a group to generate the parity sector.

The processing can include, for example, performing a data detection algorithm to detect values of bits or multi-bit symbols in the data, and performing a decoding algorithm to detect and correct errors in the data. Such a decoding algorithm can include, for example, using parity checks with parity bits embedded in the data according to a low density parity check code. The detection/decoding process is continued until all parity checks have been satisfied (i.e., the data has converged) or until a limit on the number of detection/decoding iterations has been reached and processing of the sector has failed. Parity checks can be satisfied either because any errors in the decoded data have been corrected, or because combinations of errors result in the parity checks being satisfied and the data has been miscorrected. In some embodiments, additional techniques can be applied to identify miscorrected sectors.

When one or more sectors in a track fail to successfully converge on the original data values in the detector and decoder of an iterative data processing system, reprocessing of the failed track can be performed in parallel with reading/processing of a new track. This overlapping or parallel reprocessing of a failed track with processing of a new track is referred to herein as overlapping parity sector processing. Soft information for the parity sector of the failed track is gathered during the initial processing or is regenerated during reprocessing and is stored in a central queue memory of the processing system. The failed track can then be reprocessed based on that soft information for its parity sector while another track is being processed in the system. For example, a sector from the failed track that did not previously converge can be processed in the detector while a sector from a new track is processed in the decoder, with those sectors swapping places between the detector and decoder while each are processed iteratively in the system. The term reprocessing refers herein to repeating processing of a failed data sector for a first track during the processing period for a second track.

In this way, by collecting and storing soft information for the parity sector of a failed track to facilitate later reprocessing of the failed track in overlapped fashion with processing of another track, failed tracks can be reprocessed during normal track processing periods, rather than attempting to reprocess failed tracks in track gaps between normal processing periods, or rather than delaying processing of subsequent tracks while the failed track is reprocessed.

Overlapping parity sector processing as disclosed herein is not limited to use with any particular storage system or transmission system. Overlapping parity sector processing as disclosed herein is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

Turning to FIG. 1, a storage system 100 is depicted with a read channel with overlapping parity sector processing in accordance with some embodiments of the present invention. The storage system 100 includes a read channel circuit 102 with track quality classification in accordance with one or more embodiments of the present invention. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal representative of the magnetic data on disk platter 116. This minute analog signal is transferred from read/write head assembly 120 to read channel circuit 102 via preamplifier 104. Preamplifier 104 is operable to amplify the minute analog signals accessed from disk platter 116. In turn, read channel circuit 102 digitizes and decodes the received analog signal to recreate the information originally written to disk platter 116. This data is provided as read data 122 to a receiving circuit. While processing the read data, read channel circuit 102 retains soft information for failed tracks, enabling reprocessing of a failed track in parallel with processing of another track. A write operation is substantially the opposite of the preceding read operation with write data 124 being provided to read channel circuit 102.

It should be noted that storage system 100 can be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 100 can be modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory can be used as a cache where it offers faster access time than that offered by disk platter 116. In such a case, the solid state memory can be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory that can be used in relation to various embodiments of the invention.

Figure 2:
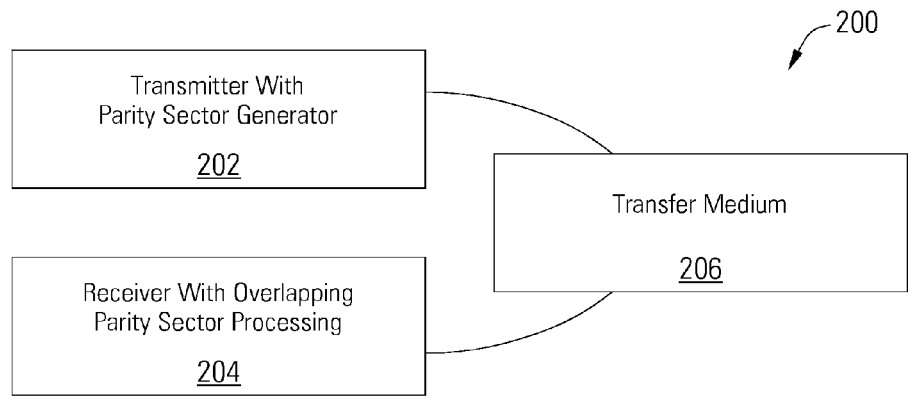
FIG. 2 depicts a wireless communication system including a receiver with overlapping parity sector processing in accordance with one or more embodiments of the present invention.

Turning to FIG. 2, a wireless communication system 200 or data transmission device including a receiver 204 with a data processing system with overlapping parity sector processing is shown in accordance with some embodiments of the present invention. The transmitter 202 is operable to encode data tracks as disclosed above, wherein each sector in a track is encoded with its own parity bits, and wherein the track is encoded with parity bits for the combined sectors to form a parity sector, and to transmit the encoded track information via a transfer medium 206. The encoded data is received from transfer medium 206 by receiver 204. Receiver 204 incorporates a data processing system with overlapping parity sector processing. If detection/decoding of a track fails in the data processing system, the failed track can be reprocessed in overlapping fashion with another track.

Figure 3:
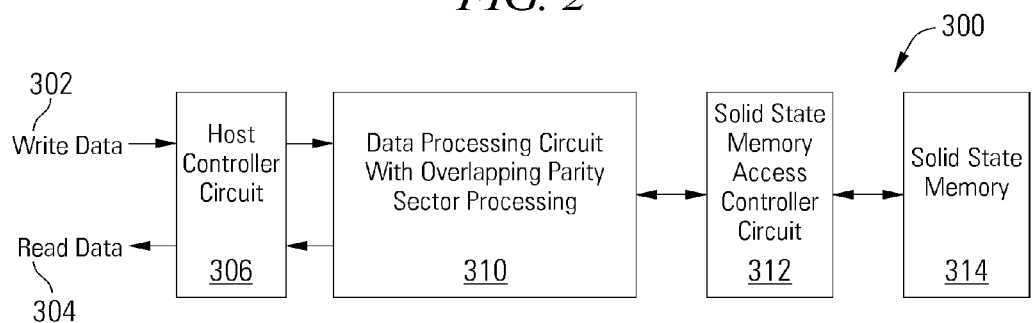
FIG. 3 depicts another storage system including a data processing circuit with overlapping parity sector processing in accordance with one or more embodiments of the present invention.

Turning to FIG. 3, another storage system 300 is shown that includes a data processing circuit 310 having with overlapping parity sector processing in accordance with one or more embodiments of the present invention. A host controller circuit 306 receives data to be stored (i.e., write data 302). This data is provided to data processing circuit 310 where it is encoded as disclosed above to include a parity sector. The encoded data is provided to a solid state memory access controller circuit 312. Solid state memory access controller circuit 312 can be any circuit known in the art that is capable of controlling access to and from a solid state memory. Solid state memory access controller circuit 312 formats the received encoded data for transfer to a solid state memory 314. Solid state memory 314 can be any solid state memory known in the art. In some embodiments of the present invention, solid state memory 314 is a flash memory. Later, when the previously written data is to be accessed from solid state memory 314, solid state memory access controller circuit 312 requests the data from solid state memory 314 and provides the requested data to data processing circuit 310. In turn, data processing circuit 310 decodes the received data with overlapping parity sector processing. The decoded data is provided to host controller circuit 306 where it is passed on as read data 304.

Figure 4:
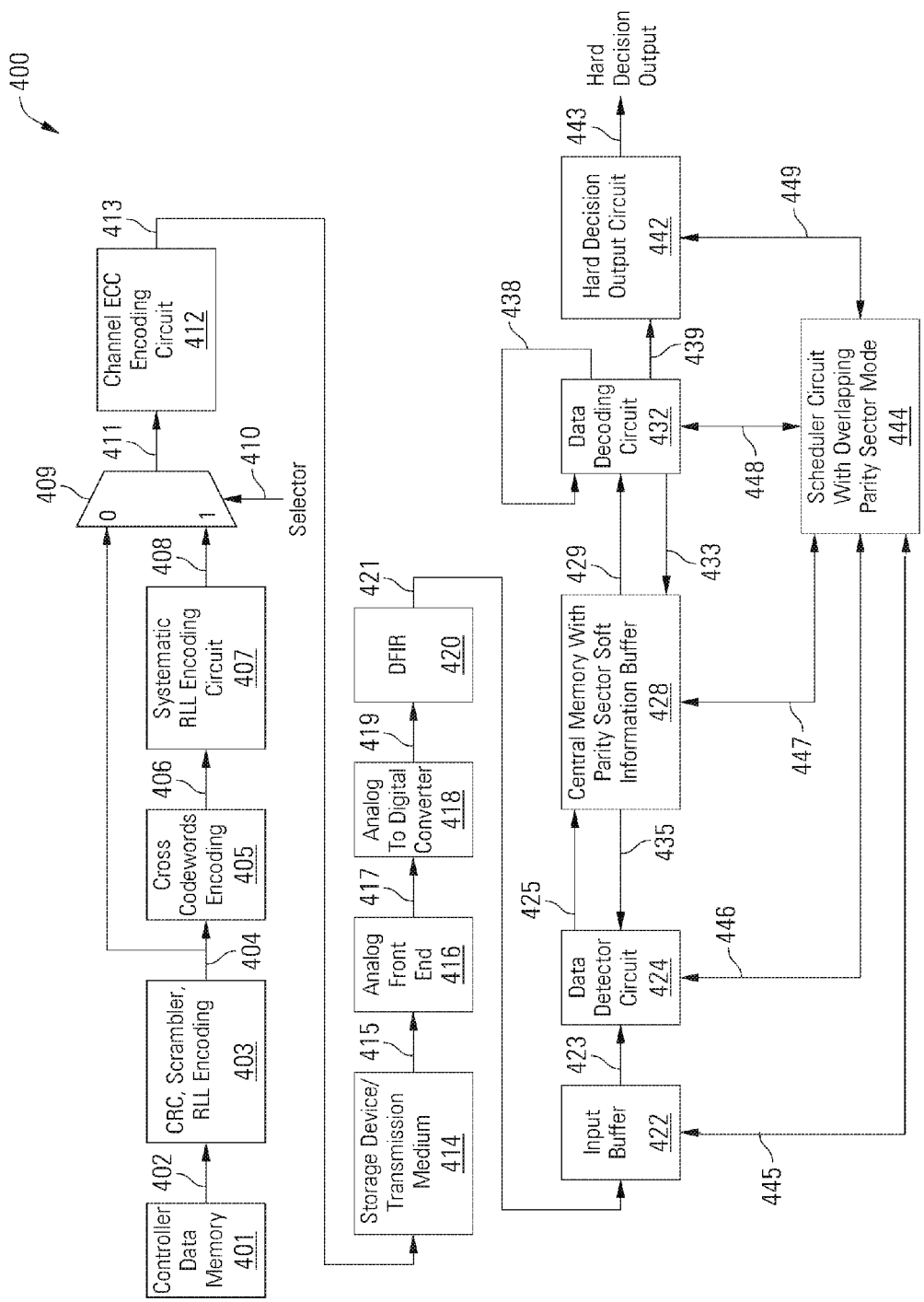
FIG. 4 depicts a read channel with overlapping parity sector processing in accordance with some embodiments of the present invention.

Turning to FIG. 4, a read channel 400 with overlapping parity sector processing is depicted in accordance with some embodiments of the present invention. Data 402 to be stored or transmitted is provided from a controller data memory 401. The stored data 402 is provided to a first level encoding circuit 403 that applies first level encoding to yield a first level encoded output 404. The encoding applied by first level encoding circuit 403 may include, for example, run length limited encoding, cyclic redundancy check encoding, scrambling and/or other known encoding processes.

First level encoded output 404 is provided to both a selector circuit 409 and a cross codewords encoding circuit 405. Cross codewords encoding circuit 405 applies an encoding algorithm to two or more of the codewords provided as first level encoded output 404 to yield an interim codeword 406. In some cases, the cross codewords encoding includes XORing all corresponding bit positions in the multiple sectors or codewords provided as first level encoded output 404 and an encoding bit is generated to yield a particular parity (e.g., odd or even parity) for the bit position including the corresponding position in interim codeword 406. The generated parity assumes the particular location in interim codeword 406, and the process is completed for each of the other bit positions in the multiple codewords provided as first level encoded output 404 to generate interim codeword 406. Interim codeword 406 is provided to a systematic run length limited encoding circuit 407 that applies run length limited encoding as is known in the art to yield a cross codewords error correction codeword 408, also referred to herein as a parity sector. Cross codewords error correction codeword 408 is provided to selector circuit 409.

It should be noted that in some embodiments of the present invention that cross codewords error correction codeword 408 is provided to a scrambler circuit (not shown). Such a scrambler circuit scrambles the elements of cross codewords error correction codeword 408 to yield a scrambled output. Scrambling may be done, for example, XORing a pseudo-random sequence with the data to make the data appear random. In such embodiments, the scrambled output is provided to selector circuit 409 in place of cross codewords error correction codeword 408. Such scrambling avoids a situation where all zeros are written to a storage medium or transmitted over a transmission medium.

Selector circuit 409 selects one of cross codewords error correction codeword 408 or codewords (sectors) in first level encoded output 404 to yield a channel encoder input codeword 411. Channel encoder input codeword 411 is provided to a channel error correction code (ECC) encoder 412 that applies an encoding algorithm to each of the codewords (i.e., each of the codewords provided as first level encoded output 404 and cross codewords error correction codeword 408) to yield an encoded output 413 representing a track containing multiple sectors or codewords. Encoded output 413 is then written to a storage medium 414 or transmitted over a transmission medium. In some embodiments, the encoding algorithm applied by channel ECC encoder 412 is a low density parity check encoding algorithm as is known in the art. In such a case, encoded output 413 is a low density parity check encoded output.

In some embodiments, the read channel 400 includes an analog front end 416 that receives the stored or transmitted encoded information as an analog input 415. Analog front end 416 processes analog input 415 and provides a processed analog signal 417 to an analog to digital converter 418. Analog front end 416 may include, but is not limited to, an analog filter and an amplifier circuit as are known in the art. Based upon the disclosure provided herein, one of ordinary skill in the art will recognize a variety of circuitry that may be included as part of analog front end 416. In some cases, analog input 415 is derived from a read/write head assembly (e.g., 120) that is disposed in relation to a storage medium (e.g., 116). In other cases, analog input 415 is derived from a receiver circuit (e.g., 204) that is operable to receive a signal from a transmission medium (e.g., 206). The transmission medium may be wired or wireless. Based upon the disclosure provided herein, one of ordinary skill in the art will recognize a variety of source from which analog signal 415 may be derived.

Analog to digital converter 418 converts processed analog signal 417 into a corresponding series of digital samples 419. Analog to digital converter 418 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 419 are provided to an equalizer circuit 420. Equalizer circuit 420 applies an equalization algorithm to digital samples 419 to yield an equalized output 421. In some embodiments of the present invention, equalizer circuit 420 is a digital finite impulse response (DFIR) filter circuit as are known in the art. It may be possible that equalized output 421 may be received directly from a storage device in, for example, a solid state storage system. In such cases, analog front end 416, analog to digital converter 418 and equalizer circuit 420 may be omitted where the data is received as a digital data input. Equalized output 421 is stored to an input buffer 422 that includes sufficient memory to maintain one or more codewords until processing of that codeword is completed through a data detector circuit 424 and a data decoding circuit 432 including, where warranted, multiple global iterations (processing passes through both data detector circuit 424 and data decoding circuit 432) and/or local iterations (processing passes through data decoding circuit 432 during a given global iteration).

Stored data sectors 423 from input buffer 422 are provided to data detector circuit 424, which is operable to apply a data detection algorithm to a received sector or codeword. In some embodiments of the present invention, data detector circuit 424 is a Viterbi algorithm data detector circuit as are known in the art. In other embodiments of the present invention, data detector circuit 424 is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention.

Upon completion of application of the data detection algorithm to the received sector on the first global iteration, data detector circuit 424 provides a detector output 425. Detector output 425 includes soft information. As used herein, the phrase "soft information" is used in its broadest sense to mean reliability data with each instance of the reliability data indicating a likelihood that the value of a corresponding bit position or group of bit positions has been correctly detected. In some embodiments of the present invention, the soft information or reliability data is log likelihood ratio data as is known in the art. Detected output 425 is stored in central memory circuit 350.

Once a data decoding circuit 432 is available, a previously stored sector is accessed from central memory circuit 428 by data decoding circuit 432 as a decoder input 429. In some embodiments of the present invention, the data decode algorithm is a low density parity check (LDPC) algorithm as are known in the art. Based upon the disclosure provided herein, one of ordinary skill in the art will recognize other decode algorithms that may be used in relation to different embodiments of the present invention. Data decoding circuit 432 applies a data decode algorithm to decoder input 429 to yield a decoded output 438. In cases where another local iteration (i.e., another pass through data decoder circuit 432) is desired, data decoding circuit 432 re-applies the data decode algorithm to decoder input 429 guided by decoded output 438. This continues until either a maximum number of local iterations is exceeded or decoded output 438 converges.

Where decoded output 438 fails to converge (i.e., fails to yield the originally written data set) and a number of local iterations through data decoder circuit 432 exceeds a threshold, the resulting decoded output 433 is stored in central memory circuit 428 to await another global iteration through data detector circuit 424. When the data detector circuit 424 becomes available, a previously stored sector that was previously processed in data decoding circuit 432 is retrieved from central memory circuit 428 by data detector circuit 424 where it is used to guide subsequent detection of the corresponding sector in input buffer 422.

Alternatively, where the decoded output converges (i.e., yields the originally written data set), the resulting decoded output is provided as an output codeword 439 to a hard decision output circuit 442. Hard decision output circuit 442 is operable to re-order track data as needed back into the original order. The hard decision output 443 can then be used in any suitable manner, such as providing it to a hard disk controller circuit that requested the data be read.

A scheduler circuit 444 controls the application of the data detection algorithm to data sectors by the data detector circuit 424 and of the data decode algorithm to data sectors by the data decoding circuit 432. When a data sector has been reached a predetermined limit on the number of global iterations in the data detector circuit 424 and data decoding circuit 432 without converging, the scheduler circuit 444 issues a kickout causing processing of the failed sector to be terminated and the processing results of the failed sector to be output. Data for the failed sector can be cleared from the input buffer 422 and central memory 428 if room is needed to process other sectors being read, or the failed sector data can be retained in the input buffer 422 and central memory 428 for later reprocessing. The scheduler circuit 444 also controls the gathering and retention of soft information from the data detector circuit 424 and/or data decoding circuit 432 for overlapping parity sector modes and reprocessing of failed sectors. To facilitate this control, the scheduler circuit 444 can be provided with one or more connections 445, 446, 447, 448, 449 as needed to the input buffer 422, data detector circuit 424, central memory 428, data decoding circuit 432 and hard decision output circuit 442, respectively. The scheduler circuit 444 can be implemented in any suitable circuit to receive read commands, monitor detection/decoding process, control storage of sector information in the input buffer 422 and central memory 428, gather failed sector and parity sector soft information, and control reprocessing of failed sectors. For example, scheduler circuit 444 can be implemented in dedicated logic circuits, state machines, microcontrollers, microprocessors, etc. Based upon the disclosure provided herein, one of ordinary skill in the art will recognize a variety of scheduler circuits that may be used in relation to different embodiments of the present invention.

The central memory 428 includes a dedicated buffer for to store soft information for all retained sectors, used to generate parity sector soft information. In some embodiments, the data decoding circuit 432 is a non-binary min-sum based low density parity check decoder, which passes log likelihood ratio (LLR) values iteratively between a variable node processor and a check node processor. Each multi-bit symbol in the sector or codeword being decoded can have one of a number of values, with those possible values being selected from a finite Galois field. The variable node processor updates the perceived value of the symbols in response to parity checks performed by the check node processor. The check node processor applies parity checks to log likelihood ratios for symbol values from the variable node processor, using a min-sum based algorithm. In the min-sum based algorithm, the check node processor identifies the minimum log likelihood ratio value, next-minimum log likelihood ratio value, and the index of the minimum log likelihood ratio value for each symbol in the sector. In these embodiments, the dedicated buffer in central memory 428 stores the minimum (min1), next-minimum (min2) and index (minind) for each symbol or bit in the parity sector.

In some embodiments, the central memory 428 also includes a dedicated buffer for hard decisions (HD) of retained sectors, those sectors of a track that failed to converge during normal processing in the data detector circuit 424 and data decoding circuit 432 before the maximum number of global iterations was reached. These hard decisions, generated in data decoding circuit 432, are buffered to facilitate parity sector soft information generation. Each retained sector is retained once to collect its soft information. The parity sector soft information of a target failed sector is then generated from the min1/min2/minind/buffered hard decisions stored in the central memory 428. Parity sector reprocessing only occupies one slot in the central memory 428, so that normal sector reading is not blocked. This enables reprocessing of a retained sector from a previous track to be overlapped with reading of a new track.

Again, the min1/min2/minind soft information is stored in central memory 428 for every retained sector of a track. In some embodiments, soft information is collected from the output 425 of the data detector circuit 424 to reduce the memory bandwidth. However, it can also be gathered from the decoder output 433 from the data decoding circuit 432. The gathering of the min1/min2/minind soft information can be performed according to the following pseudo-code:

---
Initialize: for each symbol and each LLR,
    min1 ← maximum value, min2 ← maximum value, minind = −1
For each incoming sector
  For each symbol
    For each LLR:
      if incoming LLR < min1
        min2 ← min1, min1 ← incoming LLR, minind ← sector index
      else if incoming LLR < min2
        min2 ← incoming LLR
      sign = sign XOR HD; (where sign is the sign of the hard decision)
---

For each converged sector in the track, its hard decision is accumulated to a syndrome buffer, enabling error correction across the track based on the parity sector based on the algorithm used to generate the parity sector. The syndrome buffer can be located in the central memory 428 or in any other suitable location. Hard decisions for converged sectors are accumulated in the syndrome buffer as follows: syndrome←syndrome XOR hard decisions. Again, the cross codeword encoding performed in the write portion of the read channel can include XORing all corresponding bit positions in the multiple sectors or codewords, with a corresponding parity bit in the parity sector being generated to yield a particular parity (e.g., odd or even parity) for the bit position. Accumulation of hard decisions for converged sectors plays a part in reversing this process, performing error correction across the track based on the parity sector.

If a failed sector cannot be retained because space is required in the central memory 428 for a sector in another track, its hard decision is accumulated to a second syndrome buffer, which can also be located in the central memory 428 or in any other suitable location. Hard decisions for failed sectors that cannot be retained are accumulated in the second syndrome buffer as follows: second syndrome←second syndrome XOR hard decisions.

For retained failed sectors, a sector slot (HDbuf[sectorindex]) is allocated in the central memory 428 and the hard decisions for the retained failed sector is stored in the allocated slot.

Parity sector soft information can be generated during reprocessing based on the soft information and hard decisions stored to the central memory 428 as disclosed above. The generation of the parity sector soft information, and updating of corresponding hard decisions, can be performed according to the following pseudo-code:

---
Input: sectorindex: target failed sector index, syndrome, $2^{nd}$ syndrome, HD buffer
For each symbol of the failed sector
  if(sectorindex == minind)
    psSoft = min2;
  else
    psSoft = min1;
  psHard = syndrome XOR $2^{nd}$ syndrome XOR HD[sectorindex] XOR sign
---

The overlapping parity sector modes disclosed herein enable reprocessing of a retained sector using only one slot in the central memory 428 in parallel with processing of another sector during normal sector reading, using another slot in the central memory 428. This increases utilization of the data detector circuit 424 and data decoding circuit 432, decreasing overall latency when reading data.

Depending on when retained sector soft information is gathered, and the source of that soft information, the scheduler 444 can have a number of different operating modes. Four such modes will be discussed in more detail. First, soft information for a retained sector can be collected from the data decoding circuit 432 on the fly when the scheduler 444 issues a kickout at the end of the allowed number of global iterations. Second, soft information for a retained sector can be collected from the data detector circuit 424 on the fly when the scheduler 444 issues a kickout at the end of the allowed number of global iterations. Third, soft information for a retained sector can be collected from the data detector circuit 424 during the reprocessing stage. Fourth, soft information for a retained sector can be collected from the data decoding circuit 432 during the reprocessing stage.

Turning to FIG. 5, the first scheduler mode is depicted in which soft information for a retained sector is collected from the data decoding circuit on the fly when the scheduler issues a kickout at the end of the allowed number of global iterations. A timeline shows the processing of sectors in a detector 500 and a decoder 502. Three sectors A1 504, B1 506, C1 508 of a first track 510 are first processed during the read period for the first track 510, and three sectors A2 512, B2 514, C2 516 of a second track 518 are then processed during the read period for the second track 518. Notably, reprocessing of failed sectors A1 504 and B1 506 from first track 510 is overlapped with processing of the second track 518, based on the parity sector information collected in the central memory as disclosed above.

Sector A1 504 of the first track 510 is first processed in detector 500 during the normal processing period for its track 510. It is then processed by the decoder 502, at which point it is determined that it has failed to converge after the maximum allowed number of global iterations. The scheduler issues a kickout 522 for sector A1 504 when it is on its last allowed decoding iterations. When that decoding of sector A1 504 has failed, the soft information for failed sector A1 504 is obtained from the decoder 502 and is stored in the parity sector memory 530. After the kickout 522, parity sector memory 530 thus includes soft information 532 for failed sector A1 504. Sector B1 506 is processed in the detector 500 and decoder 502 in a similar alternating fashion during the normal processing period for its track 510, until it is determined that it has failed to converge after the maximum allowed number of global iterations. The scheduler issues a kickout 524 for sector B1 506 when it is on its last allowed decoding iterations. When that decoding of sector B1 506 has failed, the soft information for failed sector B1 506 is obtained from the decoder 502 and is stored in the parity sector memory 530. After the kickout 524, parity sector memory 530 thus includes soft information 534 for both failed sector A1 504 and failed sector B1 506. Sector C1 508 of the first track 510 is processed in a similar manner, although the timeline does not show convergence or kickout for sector C1 508.

During the processing period for the second track 518, processing of failed sectors A1 504 and B1 506 is overlapped with normal processing of sectors A2 512, B2 514 and C2 516, based on information stored in the parity sector memory 530. Thus, in the first overlapping parity sector scheduler mode, soft information for a retained sector is collected from the decoder on the fly when the scheduler 444 issues a kickout at the end of the allowed number of global iterations.

Turning to FIG. 6, the second scheduler mode is depicted in which soft information for a retained sector is collected from the data detector circuit on the fly when the scheduler issues a kickout at the end of the allowed number of global iterations. A timeline shows the processing of sectors in a detector 600 and a decoder 602. Three sectors A1 604, B1 606, C1 608 of a first track 610 are first processed during the read period for the first track 610, and three sectors A2 612, B2 614, C2 616 of a second track 618 are then processed during the read period for the second track 618. Notably, reprocessing of failed sectors A1 604 and B1 606 from first track 610 is overlapped with processing of the second track 618, based on the parity sector information collected in the central memory as disclosed above.

Sector A1 604 of the first track 610 is first processed in detector 600 during the normal processing period for its track 610. It is then processed by the decoder 602, at which point it is determined that it has failed to converge after the maximum allowed number of global iterations. The scheduler issues a kickout 622 for sector A1 604 when it is on its last allowed decoding iterations. When that decoding of sector A1 604 has failed, a dedicated detector slot is scheduled for the failed sector A1 604, allowing it to be processed in the detector 600 one more time after the kickout 622. The soft information for failed sector A1 604 is then obtained from the detector 600 and is stored in the parity sector memory 630. After the detector stage following the kickout 622, parity sector memory 630 thus includes soft information 632 for failed sector A1 604. Sector B1 606 is processed in the detector 600 and decoder 602 in a similar alternating fashion during the normal processing period for its track 610, until it is determined that it has failed to converge after the maximum allowed number of global iterations. The scheduler issues a kickout 624 for sector B1 606 when it is on its last allowed decoding iterations. When that decoding of sector B1 606 has failed, a dedicated detector slot is scheduled for the failed sector B1 606, allowing it to be processed in the detector 600 one more time after the kickout 624. The soft information for failed sector B1 606 is then obtained from the detector 600 and is stored in the parity sector memory 630. After the detector stage following the kickout 624, parity sector memory 630 thus includes soft information 634 for both failed sector A1 604 and failed sector B1 606. Sector C1 608 of the first track 610 is processed in a similar manner, although the timeline does not show convergence or kickout for sector C1 608.

During the processing period for the second track 618, processing of failed sectors A1 604 and B1 606 is overlapped with normal processing of sectors A2 612, B2 614 and C2 616, based on information stored in the parity sector memory 630. Thus, in the second overlapping parity sector scheduler mode, soft information for a retained sector is collected from the detector on the fly when the scheduler issues a kickout at the end of the allowed number of global iterations.

Figure 7:
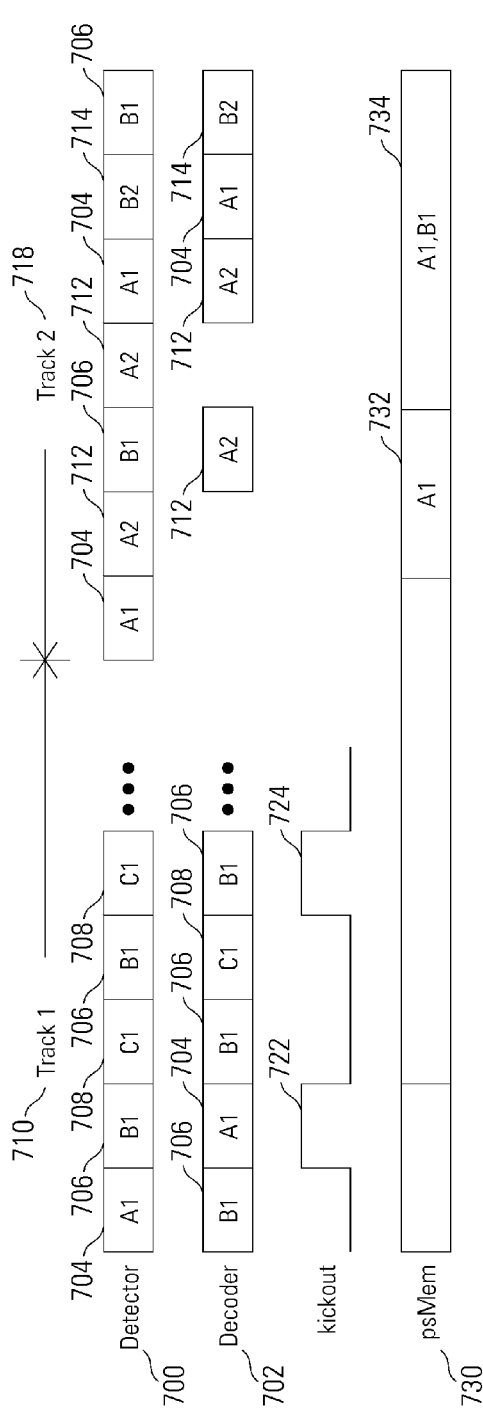
FIG. 7 depicts a scheduler mode for a read channel with overlapping parity sector processing which collects detector soft information of a data sector during a reprocessing stage in accordance with some embodiments of the present invention.

Turning to FIG. 7, the third scheduler mode is depicted in which soft information for a retained sector is collected from the data detector circuit during the reprocessing stage. A timeline shows the processing of sectors in a detector 700 and a decoder 702. Three sectors A1 704, B1 706, C1 708 of a first track 710 are first processed during the read period for the first track 710, and three sectors A2 712, B2 714, C2 716 of a second track 718 are then processed during the read period for the second track 718. Notably, reprocessing of failed sectors A1 704 and B1 706 from first track 710 is overlapped with processing of the second track 718, based on the parity sector information collected in the central memory as disclosed above.

Sector A1 704 of the first track 710 is first processed in detector 700 during the normal processing period for its track 710. It is then processed by the decoder 702, at which point it is determined that it has failed to converge after the maximum allowed number of global iterations. The scheduler issues a kickout 722 for sector A1 704 when it is on its last allowed decoding iterations, ending processing of sector A1 704 during the processing period for its track 710. However, in this scheduler mode, soft information is not gathered and stored for failed sector A1 704 during the processing period for its track 710. Sector B1 706 is processed in the detector 700 and decoder 702 in a similar alternating fashion during the normal processing period for its track 710, until it is determined that it has failed to converge after the maximum allowed number of global iterations. The scheduler issues a kickout 724 for sector B1 706 when it is on its last allowed decoding iterations, ending processing of sector B1 706 during the processing period for its track 710. However, in this scheduler mode, soft information is not gathered and stored for failed sector B1 706 during the processing period for its track 710. Sector C1 708 of the first track 710 is processed in a similar manner, although the timeline does not show convergence or kickout for sector C1 708.

During the processing period for the second track 718, dedicated detector runs are scheduled for each retained sector A1 704 and B1 706 to regenerate their parity sector soft information. After retained failed sector A1 704 is processed in detector 700 during the processing period for the second track 718, soft information 732 for failed sector A1 704 is obtained from the detector 700 and is stored in the parity sector memory 730. Normal processing of sector A2 712 from the second track 718 can begin as soon as the detector 700 is available. After retained failed sector B1 706 is processed in detector 700 during the processing period for the second track 718, soft information for failed sector B1 706 is obtained from the detector 700 and is stored in the parity sector memory 730, so that parity sector memory 730 includes soft information 734 for both failed sectors A1 704 and B1 706. At this point, reprocessing of failed sectors A1 704 and B1 706 is overlapped with normal processing of sectors A2 712, B2 714 and C2 716, based on information stored in the parity sector memory 730. Thus, in the third overlapping parity sector scheduler mode, soft parity sector information for a retained sector is collected from the data detector circuit during the reprocessing stage.

Figure 8:
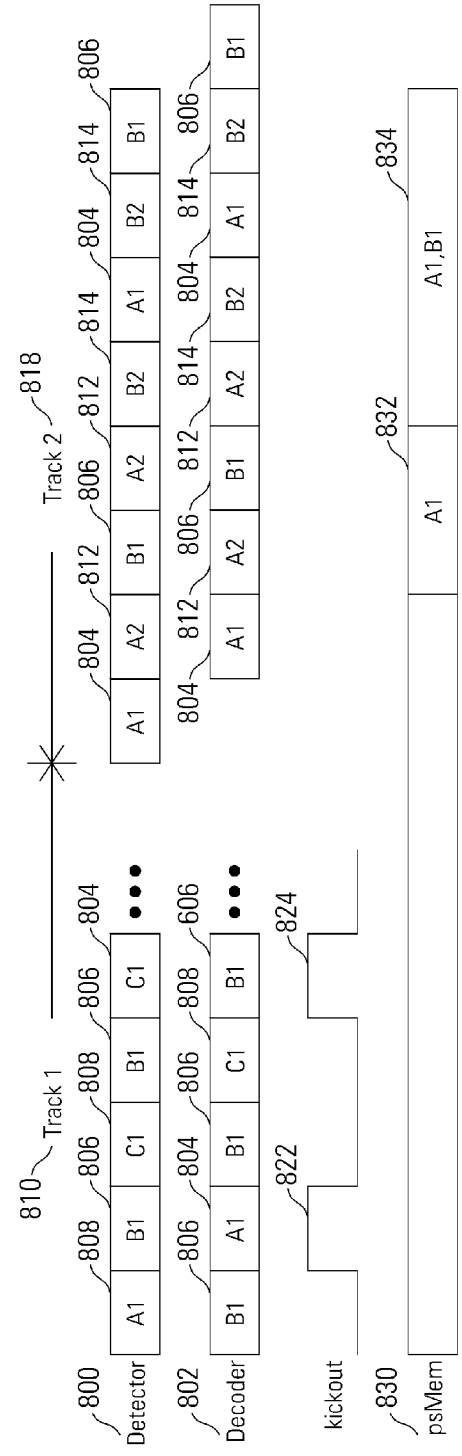
FIG. 8 depicts a scheduler mode for a read channel with overlapping parity sector processing which collects decoder soft information of a data sector during a reprocessing stage in accordance with some embodiments of the present invention.

Turning to FIG. 8, the fourth scheduler mode is depicted in which soft information for a retained sector is collected from the data decoding circuit during the reprocessing stage. Three sectors A1 804, B1 806, C1 808 of a first track 810 are first processed during the read period for the first track 810, and three sectors A2 812, B2 814, C2 816 of a second track 818 are then processed during the read period for the second track 818. Notably, reprocessing of failed sectors A1 804 and B1 806 from first track 810 is overlapped with processing of the second track 818, based on the parity sector information collected in the central memory as disclosed above.

Sector A1 804 of the first track 810 is first processed in detector 800 during the normal processing period for its track 810. It is then processed by the decoder 802, at which point it is determined that it has failed to converge after the maximum allowed number of global iterations. The scheduler issues a kickout 822 for sector A1 804 when it is on its last allowed decoding iterations, ending processing of sector A1 804 during the processing period for its track 810. However, in this scheduler mode, soft information is not gathered and stored for failed sector A1 804 during the processing period for its track 810. Sector B1 806 is processed in the detector 800 and decoder 802 in a similar alternating fashion during the normal processing period for its track 810, until it is determined that it has failed to converge after the maximum allowed number of global iterations. The scheduler issues a kickout 824 for sector B1 806 when it is on its last allowed decoding iterations, ending processing of sector B1 806 during the processing period for its track 810. However, in this scheduler mode, soft information is not gathered and stored for failed sector B1 806 during the processing period for its track 810. Sector C1 808 of the first track 810 is processed in a similar manner, although the timeline does not show convergence or kickout for sector C1 808.

During the processing period for the second track 818, dedicated detector and decoder runs are scheduled for each retained sector A1 804 and B1 806 to regenerate their parity sector soft information. After retained failed sector A1 804 is processed in detector 800 and decoder 802 during the processing period for the second track 818, soft information 832 for failed sector A1 804 is obtained from the decoder 802 and is stored in the parity sector memory 830. After retained failed sector B1 806 is processed in detector 800 and decoder 802 during the processing period for the second track 818, soft information for failed sector B1 806 is obtained from the decoder 802 and is stored in the parity sector memory 830, so that parity sector memory 830 includes soft information 834 for both failed sectors A1 804 and B1 806. At this point, reprocessing of failed sectors A1 804 and B1 806 is overlapped with normal processing of sectors A2 812, B2 814 and C2 816, based on information stored in the parity sector memory 830. Thus, in the fourth overlapping parity sector scheduler mode, soft parity sector information for a retained sector is collected from the data decoding circuit during the reprocessing stage.

Figure 9:
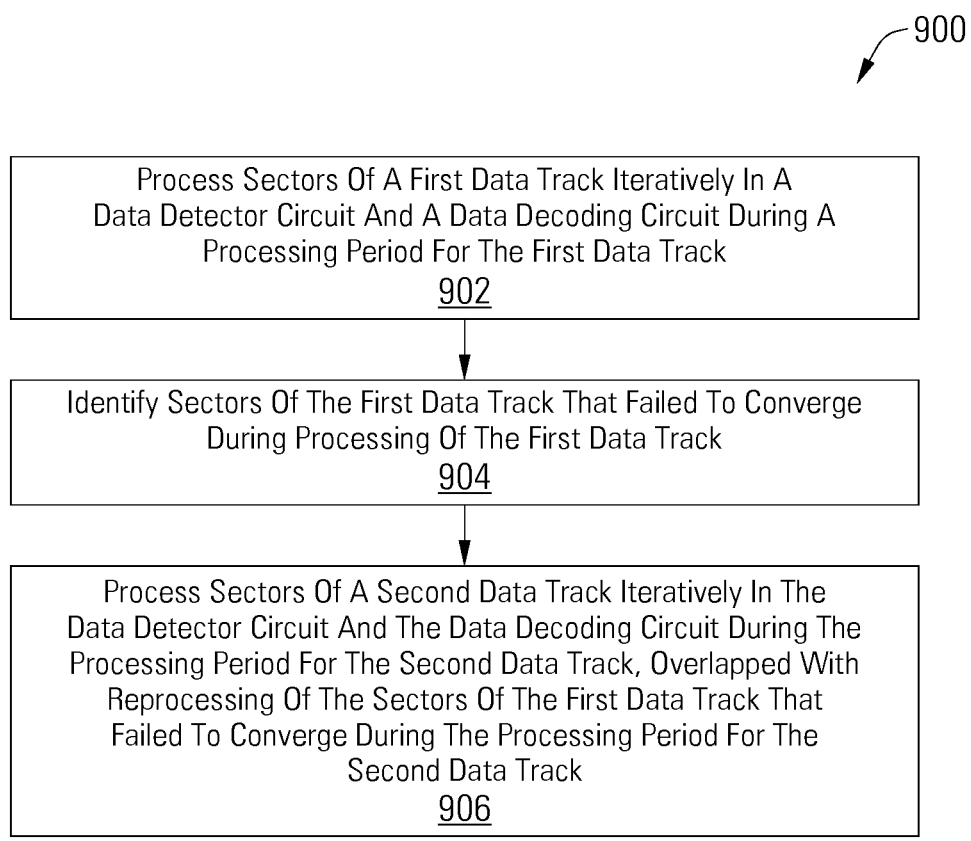
FIG. 9 is a flow diagram of a method to process data in a read channel with overlapping parity sector processing in accordance with some embodiments of the present invention.

Turning to FIG. 9, a flow diagram 900 depicts a method to process data in a read channel with overlapping parity sector processing in accordance with some embodiments of the present invention. Following flow diagram 900, sectors of a first data track are processed iteratively in a data detector circuit and a data decoding circuit during a processing period for the first data track. (Block 902) Sectors of the first data track that failed to converge during processing of the first data track are identified. (Block 904) Sectors of a second data track are processed iteratively in the data detector circuit and the data decoding circuit during the processing period for the second data track, overlapped with reprocessing of the sectors of the first data track that failed to converge during the processing period for the second data track. (Block 906) The reprocessing of the failed sectors of the first data track is performed based at least in part on parity sector soft information for the failed sectors. The parity sector soft information for the failed sectors can be gathered and stored in a central memory between the data detector and data decoder, either on the fly during initial processing or during reprocessing, and can be gathered either from the data detector or the data decoder. Where the data decoder is a non-binary min-sum based low density parity check decoder, the parity sector soft information includes, for example, min1/min2/minind information for retained sectors that failed to converge during normal processing.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for overlapping parity sector processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus for processing data, comprising:
a data detector configured to detect data values in data sectors to yield detected data;
a data decoder configured to decode the detected data, wherein the data detector and the data decoder are configured to process the data sectors in a series of global iterations;
a memory configured to store parity sector soft information of a failed sector that failed to converge; and
a scheduler configured to control overlapping reprocessing of the failed sector in the data detector and the data decoder based on the parity sector soft information with processing of another data sector in the data detector and the data decoder,
wherein the parity sector soft information is generated from first minimum log likelihood ratios, next minimum log likelihood ratios, index of minimum log likelihood ratios, and hard decisions for each symbol associated with a parity sector in a data track.

2. The apparatus of claim 1, wherein the data decoder comprises a low density parity check decoder.

3. The apparatus of claim 1, wherein the parity sector soft information to be stored in the memory is gathered from the data detector for the failed one of the data sectors when it is kicked out of the apparatus.

4. The apparatus of claim 1, wherein the parity sector soft information to be stored in the memory is gathered from the data detector for the failed one of the data sectors during reprocessing of said failed one of the data sectors.

5. The apparatus of claim 1, wherein the parity sector soft information to be stored in the memory is gathered from the data decoder for the failed one of the data sectors when it is kicked out of the apparatus.

6. The apparatus of claim 1, wherein the parity sector soft information to be stored in the memory is gathered from the data decoder for the failed one of the data sectors during reprocessing of said failed one of the data sectors.

7. The apparatus of claim 1, wherein the memory is further configured to store the hard decisions for retained sectors.

8. The apparatus of claim 7, wherein the data decoder is operable to generate the parity sector soft information.

9. A method of processing data, comprising:
processing sectors of a first data track iteratively in a data detector circuit and a data decoding circuit during a processing period for the first data track;
identifying sectors of the first data track that failed to converge during processing of the first data track;
processing sectors of a second data track iteratively in the data detector circuit and the data decoding circuit during the processing period for the second data track, overlapped with reprocessing of the sectors of the first data track that failed to converge, the reprocessing being performed during the processing period for the second data track;
gathering soft information for retained ones of the sectors of the first data track that failed to converge, wherein the soft information for retained ones of the sectors of the first data track that failed to converge comprises minimum log likelihood ratios, next minimum log likelihood ratios, and index of minimum log likelihood ratios for each symbol in the retained ones of the sectors.

10. A method of processing data, comprising:
processing sectors of a first data track iteratively in a data detector circuit and a data decoding circuit during a processing period for the first data track;
identifying sectors of the first data track that failed to converge during processing of the first data track; and
processing sectors of a second data track iteratively in the data detector circuit and the data decoding circuit during the processing period for the second data track, overlapped with reprocessing of the sectors of the first data track that failed to converge, the reprocessing being performed during the processing period for the second data track, wherein the first data track and the second data track are different data tracks on a magnetic storage medium.

11. The method of claim 10, wherein the reprocessing of the sectors of the first data track that failed to converge is performed based at least in part on parity sector soft information for the sectors of the first data track that failed to converge.

12. The method of claim 10, further comprising gathering soft information for retained ones of the sectors of the first data track that failed to converge.

13. The method of claim 12, wherein the soft information for retained ones of the sectors of the first data track that failed to converge is gathered from the data detector circuit.

14. The method of claim 12, wherein the soft information for retained ones of the sectors of the first data track that failed to converge is gathered from the data decoding circuit.

15. The method of claim 12, wherein the soft information for retained ones of the sectors of the first data track that failed to converge is gathered on the fly and stored during the processing period for the first data track.

16. The method of claim 12, wherein the soft information for retained ones of the sectors of the first data track that failed to converge is gathered during the reprocessing during the processing period for the second data track.

17. The method of claim 10, further comprising accumulating hard decisions in a syndrome buffer for each of the sectors of a first data track as they converge during the processing period for the first data track, and accumulating hard decisions in a second syndrome buffer for each of the sectors of the first data track that failed to converge during the processing period for the first data track and that are not retained in a memory circuit between the data detector circuit and the data decoding circuit.

18. The method of claim 17, further comprising generating parity sector hard decisions based at least in part on the hard decisions in the syndrome buffer and the hard decisions in the second syndrome buffer.

19. A storage system comprising:
a storage medium;
a head assembly to retrieve data tracks from the storage medium;
a data detector to detect data values in sectors from the data tracks and to decode the sectors from the data tracks;

a memory to store parity sector soft information for retained failed ones of the sectors that failed to converge; and a scheduler to schedule overlapping reprocessing of the retained failed ones of the sectors based at least in part on the parity sector soft information and processing of another of the sectors from another of the data tracks, wherein the parity sector soft information for the retained failed ones of the sectors that failed to converge is generated from minimum log likelihood ratios, next minimum log likelihood ratios, and index of minimum log likelihood ratios for each symbol in the retained failed ones of the sectors.

20. The storage system of claim 19, wherein the parity sector soft information is further generated based from hard decisions.

* * * * *